(12) United States Patent
Chen et al.

(10) Patent No.: US 10,387,748 B2
(45) Date of Patent: Aug. 20, 2019

(54) METHOD FOR SALIENT OBJECT SEGMENTATION OF IMAGE BY AGGREGATING MULTI-LINEAR EXEMPLAR REGRESSORS

(71) Applicant: BEIHANG UNIVERSITY, Beijing (CN)

(72) Inventors: Xiaowu Chen, Beijing (CN); Changqun Xia, Beijing (CN); Jia Li, Beijing (CN); Qinping Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 122 days.

(21) Appl. No.: 15/792,712

(22) Filed: Oct. 24, 2017

(65) Prior Publication Data

US 2018/0204088 A1 Jul. 19, 2018

(30) Foreign Application Priority Data

Jan. 13, 2017 (CN) .......................... 2017 1 0024794

(51) Int. Cl.
*G06K 9/46* (2006.01)
*G06T 7/194* (2017.01)
(Continued)

(52) U.S. Cl.
CPC ......... *G06K 9/4671* (2013.01); *G06K 9/4638* (2013.01); *G06K 9/6262* (2013.01);
(Continued)

(58) Field of Classification Search
None
See application file for complete search history.

(56) References Cited

U.S. PATENT DOCUMENTS

2015/0206319 A1 7/2015 Dollar et al.

FOREIGN PATENT DOCUMENTS

| CN | 102034102 A | 4/2011 |
|---|---|---|
| CN | 102722891 A | 10/2012 |

(Continued)

OTHER PUBLICATIONS

The Chinese First Examination Report, including Search Report, of corresponding Chinese application No. 201710024794.9, dated Mar. 5, 2019.

(Continued)

*Primary Examiner* — Mark Roz
(74) *Attorney, Agent, or Firm* — J.C. Patents

(57) ABSTRACT

Provided is a method for salient object segmentation of an image by aggregating a multi-linear exemplar regressors, including: analyzing and summarizing visual attributes and features of a salient object and a non-salient object using background prior and constructing a quadratic optimization problem, calculating an initial saliency probability map, selecting a most trusted foreground and a background seed point, performing manifold preserving foreground propagation, generating a final foreground probability map; generating a candidate object set for the image via an objectness adopting proposal, using a shape feature, a foregroundness and an attention feature to characterize each candidate object, training the linear exemplar regressors for each training image to characterize a particular saliency pattern of the image; aggregating a plurality of linear exemplar regressors, calculating saliency values for the candidate object set of a test image, and forming an image salient object segmentation model capable of processing various complex scenarios.

6 Claims, 9 Drawing Sheets

(51) Int. Cl.
    *G06T 7/70*     (2017.01)
    *G06T 7/80*     (2017.01)
    *G06T 7/11*     (2017.01)
    *G06T 7/143*    (2017.01)
    *G06K 9/62*     (2006.01)

(52) U.S. Cl.
    CPC ............... *G06T 7/11* (2017.01); *G06T 7/143* (2017.01); *G06T 7/194* (2017.01); *G06T 7/70* (2017.01); *G06T 7/80* (2017.01); *G06T 2207/10024* (2013.01); *G06T 2207/20016* (2013.01); *G06T 2207/20076* (2013.01); *G06T 2207/20156* (2013.01)

(56) References Cited

FOREIGN PATENT DOCUMENTS

| | | |
|---|---|---|
| CN | 103745468 A | 4/2014 |
| CN | 103747240 A | 4/2014 |
| CN | 104504692 A | 4/2015 |
| CN | 105205501 A | 12/2015 |

OTHER PUBLICATIONS

Achanta, Radhakrishna et al., "SLIC Superpixels Compared to State-of-the-art Superpixel Methods" Journal of Latex Class Files; vol. 6, No. 1; Dec. 2011; pp. 1-8.

Arbelaez, Pablo et al., "Multiscale Combinatorial Grouping" Computer Vision and Pattern Recognition (CVPR), 2014 IEEE Conference on Jun. 23-28, 2014.

Cheng, Ming-Ming et al., "Efficient Salient Region Detection with Soft Image Abstraction" Computer Vision (ICCV), 2013 IEEE International Conference on Dec. 1-8, 2013.

Goferman, Stas et al., "Context-Aware Saliency Detection" IEEE Transactions on Pattern Analysis and Machine Intelligence; vol. 34, No. 10; Oct. 2012; pp. 1915-1926.

He, Shengfeng et al., "SuperCNN: A Superpixelwise Convolutional Neural Network for Salient Object Detection" International Journal of Computer Vision; vol. 115, Issue 3; Dec. 2015; pp. 330-344.

Jiang, Peng et al., "Salient Region Detection by UFO: Uniqueness, Focusness and Objectness" ICCV '13 Proceedings of the 2013 IEEE International Conference on Computer Vision; Dec. 1-8, 2013; pp. 1976-1983.

Liu, Nian et al., "DHSNet: Deep Hierarchical Saliency Network for Salient Object Detection" Computer Vision and Pattern Recognition (CVPR), 2016 IEEE Conference on Jun. 27-30, 2016.

Zhang, Jianming et al., "Minimum Barrier Salient Object Detection at 80 FPS" ICCV '15 Proceedings of the 2015 IEEE International Conference on Computer Vision (ICCV); Dec. 7-13, 2015; pp. 1404-1412.

METHOD FOR SALIENT OBJECT SEGMENTATION OF IMAGE BY AGGREGATING MULTI-LINEAR EXEMPLAR REGRESSORS

CROSS-REFERENCE TO RELATED APPLICATIONS

This application claims priority to Chinese Patent Application No. 201710024794.9, filed on Jan. 13, 2017, which is hereby incorporated by reference in its entirety.

TECHNICAL FIELD

The present disclosure relates to the computer vision and image video processing field and, in particular, to a method for salient object segmentation of an image by aggregating multi-linear exemplar regressors.

BACKGROUND

As an important fundamental problem of computer vision techniques, image salient object segmentation is attracting interests and attention of current researchers increasingly. In a process of image salient object segmentation, the most critical step is to use visual attributes to highlight salient objects and suppress non-salient objects. However, for a complex scenario, it is not clear which visual attribute is capable of persistently highlighting the salient objects, in addition, for a case where the salient objects and the non-salient objects have the same visual attributes, it is not clear how to segment and distinguish them from each other correctly. Therefore, it is necessary to investigate what is and what is a not salient object before researching and developing a salient object segmentation model.

During the past ten years, many research works have been done to make a comprehensive and convincing definition of the salient object. For instance, Jiang et al. published a paper in the CVPR conference of 2013 to propose that the salient object is characterized by uniqueness, focus degree and objectiveness in common. In the work published by Cheng et al. in the CVPR conference of 2013, the salient object was considered to be unique, and have a compact spatial distribution. In the works published by Goferman et al. in the TPAMI of 2012, the salient object was considered to have a unique distinction compared with a local or a global peripheral context image. Based on these findings, salient object segmentation models are proposed in many researches, which are used to determine an image region, a superpixel or a pixel-level saliency by designing different heuristic features. Generally, these salient object segmentation models have achieved good performance in simple scenarios that are clearly distinguishable, however, for complex scenarios, salient objects and non-salient objects usually have common visual attributes, making it difficult for the segmentation models to correctly distinguish the salient objects from the non-salient objects.

At present, by using a large-scale image benchmark dataset, a sufficiently complex image salient object segmentation model may be trained, for instance, in 2015, He el al. used a deep neural network to train the salient object segmentation model in a superpixel level in the IJCV, in 2016, Liu el al. proposed to use a recurrent neural network to obtain a hierarchical saliency segmentation model in the CVPR. These models may partially solve a problem presenting in a complex scenario, but training of these models is very difficult, and it is not easy to satisfy the requirement of a large number of trained benchmark image data. In addition, as a matter of fact, it is not clear which part of visual attributes contributes the most to the distinction between the salient objects and the non-salient objects due to the "black box" nature of deep learning techniques such as the deep neural network, the recurrent neural network and the like.

Therefore, exploration of respective essence of a salient object and a non-salient object not only has enlightening significance to the designing of visual attribute descriptions characterizing a candidate object set, but also has guiding significance to the construction of an image salient object segmentation model capable of being adaptive to various complex scenarios.

SUMMARY

According to the above actual needs and key issues, an objective of the present disclosure lies in: constructing an image salient benchmark dataset, deeply analyzing an image which is retained and discarded during construction of the dataset, exploring and summarizing intrinsic visual attributes of a salient object and a non-salient object; in order to suppress an interference background having a plurality of similar objects, the present disclosure proposes a foreground propagation approach based on manifold preserving to generate a foreground probability map; in order to process scenarios with different complexities adaptively, the constructed salient object segmentation model enables selection of a saliency pattern characterized by a most relevant linear exemplar regressor and suppression of an irrelevant saliency pattern.

In order to accomplish the objective of the present disclosure, the technical solution used in the present disclosure lies in: a method for salient object segmentation of an image by aggregating multi-linear exemplar regressors, where the method includes steps of:

step (1), analyzing and constructing a salient object and a non-salient object in an image salient benchmark dataset, summarizing and defining intrinsic visual attributes of the non-salient object and the salient object respectively;

step (2), guiding manifold preserving foreground propagation by using a background prior condition in combination with a local linear embedding algorithm based on superpixel division, generating an image foreground probability map collaboratively;

step (3), based on the foreground probability map and features of the visual attributes of the non-salient object and the salient object as provided in the present disclosure, defining steps for image salient object segmentation as:

step (3.1), using each training image to generate a candidate object set via an objectness adopting proposal, defining feature descriptions of each image candidate object, including a geometric shape feature, a foregroundness and an attention feature;

step (3.2), treating the candidate object of the training image as a training sample, and setting positive samples and negative samples, constructing linear exemplar regressors based on a linear support vector machine;

step (3.3), defining an aggregation pattern for the multi-linear exemplar regressors, adaptively determining for the candidate object of each test image a saliency value, rendering to better suppress the non-salient object and highlight the salient object, and fulfilling the image salient object segmentation.

Furthermore, firstly, the present disclosure explores and summarizes the features of the visual attributes of the salient object and the non-salient object. By constructing the image salient benchmark dataset, deeply analyze an image which is discarded and included during the construction of the dataset, comprehensively investigate and survey the intrinsic visual attributes of the salient object and the non-salient object. In the determination of whether the image including the salient object, if being determined ambiguous or confusing, then discard the object. Top three reasons which prevent an object from being determined as an unambiguous salient object include: a plurality of similar objects, complex boundary shape and low objectiveness. For an image including an explicit salient object, it is found that different images have significantly different saliency patterns, thus a salient object segmentation model should be capable of adaptively satisfying different image scenarios and suppressing interference of the non-salient object.

Furthermore, the three main features of the non-salient object are respectively a plurality of similar objects, complex boundary shape and low objectiveness. A plurality of similar objects means that, for an image including a plurality of similar candidate objects, it is difficult to decide which object is most salient. That is to say, when each of the plurality of objects is likely to be determined as a salient object, multi-label ambiguity will be incurred inevitably. Complex boundary shape means that, the more complex the shape of an object, the more likely to be determined as a non-salient, especially in a case where the object has a fuzzy boundary or is blocked partially, the object will be determined as a non-salient object mostly. Low objectiveness means that, due to semantic attributes, a most salient region will also be determined as the salient object, particularly roads, water or rocks. These semantic objects are usually treated as image backgrounds.

Furthermore, in order to suppress the non-salient object containing a plurality of similar objects, the present disclosure proposes a method for generating a foreground probability map. Firstly, divide the image into superpixels, then introduce a background prior assumption condition, construct a quadratic optimization problem, solve an initial foreground probability map, adaptively select a threshold value, select a most trusted foreground seed point and a most trusted background seed point; then use the local linear embedding algorithm to construct a nearest-neighbor linear relation between each superpixel and feature space, perform manifold preserving foreground propagation in combination with the trusted seed point, and obtain a final foreground probability map possibly by highlighting the salient object and suppressing a candidate background object including a plurality of similar objects.

Furthermore, according to the main features of the non-salient object, the present disclosure defines the feature descriptions of the candidate object. Firstly, divide the image into a candidate object set by using the objectness adopting proposal, and use an objectness score to characterize a probability for each candidate object to become the object. According to top three features of the intrinsic visual attributes of the non-salient object, that is, a plurality of similar objects, complex boundary shape and low objectiveness, perform feature descriptions for each image candidate object, including a geometric shape feature, a foregroundness and an attention feature. To this end, generate a foregroundness by using the foreground probability map generated in step (2); generate an interest probability map by using a pre-trained attention fixation prediction model, and generate the attention feature for each candidate object; additionally, for each candidate object, characterize geometric attributes thereof using a ratio of length to width, a ratio of area to perimeter, a center of gravity position and eccentricity and the like.

Furthermore, the present disclosure constructs the linear exemplar regressors. For each training image, firstly generate a candidate object set, perform characterization thereto by using the three feature descriptions; then calculate a benchmark degree for each candidate object according to a benchmark saliency map of the training image, set a threshold value of the benchmark degree, divide the candidate object set into positive samples and negative samples; and finally train the linear exemplar regressors by using the linear support vector machine to characterize a specific pattern to highlight the salient object and suppress the non-salient object.

Furthermore, each linear exemplar regressor characterizes a particular saliency pattern of a corresponding training image, in order to be able to process a salient object segmentation task of any complex scenario, should be capable of adaptively aggregating the linear exemplar regressors. For any candidate object of a test image, each linear exemplar regressor may calculate a saliency probability it characterizes, design a perception function to render it to highlight a most relevant linear exemplar regressor, suppress noise caused by an irrelevant regression, and improve accuracy of final saliency results.

Compared with the existing image salient object segmentation method, the present disclosure is advantageous in that:

(1) the present disclosure explores and analyzes features of intrinsic visual attributes of a salient object and a non-salient object by constructing an image benchmark salient dataset;

(2) in combination with a background prior and local linear embedding algorithm, the present disclosure proposes a manifold preserving foreground propagation method to generate a foreground probability map, which may suppress an interference background containing a plurality of similar objects;

(3) the present disclosure proposes a method for salient object segmentation of an image by aggregating multi-linear exemplar regressors, which characterizes a variety of different saliency patterns and, which, for images having scenarios with different complexities, may adaptively select a most relevant linear exemplar regressor and suppress noise caused by an irrelevant regression.

DESCRIPTION OF EMBODIMENTS

The present disclosure will be described hereunder in detail with reference to the accompanying drawings.

Figure 1A:
FIG. 1A is a representative image including a plurality of similar candidate objects.
Figure 1B:
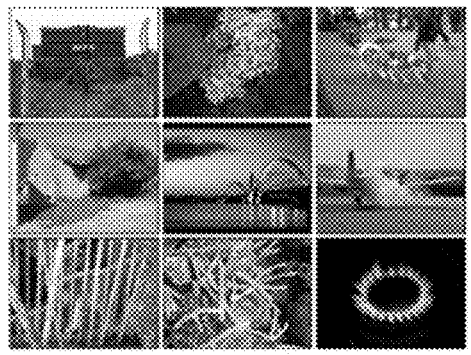
FIG. 1B is a representative image including a candidate object with complex boundary.
Figure 1C:
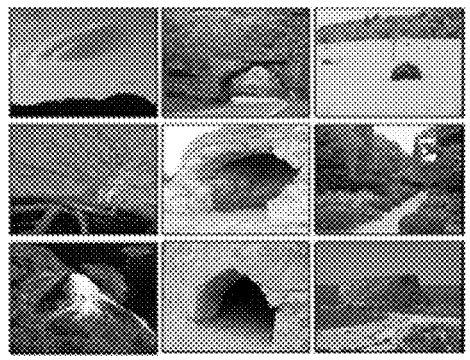
FIG. 1C is a representative image including a candidate object with low objectness.
Figure 2A:
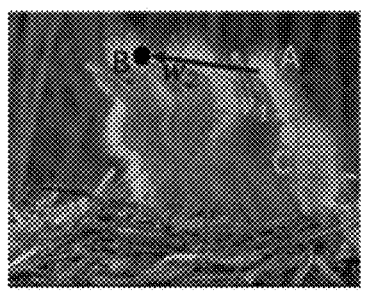
FIG. 2A is an input image.
Figure 2B:
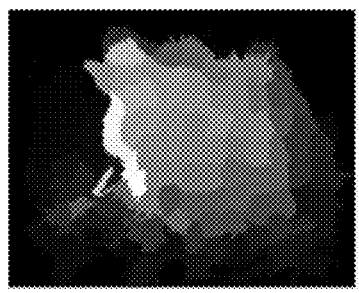
FIG. 2B is an initial foreground probability map used for selecting a seed point.
Figure 2C:
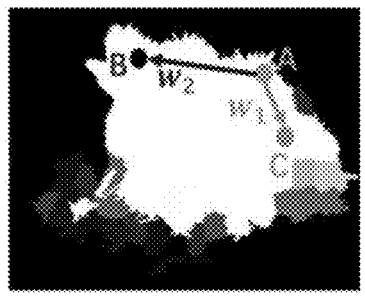
FIG. 2C is a manifold preserving image foreground probability map.
Figure 2D:
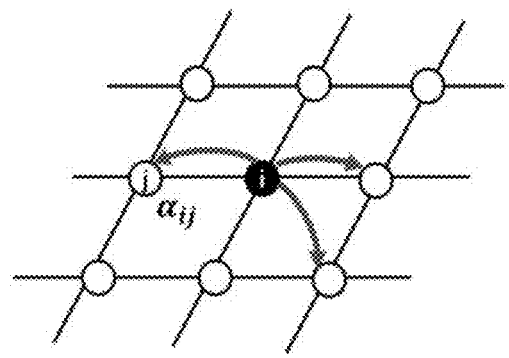
FIG. 2D is a graph model of enforcing the spatial relationship between superpixels and FIG. 2E is a graph model of enforcing the manifold-preserving foregroundness propagation.
Figure 2E:
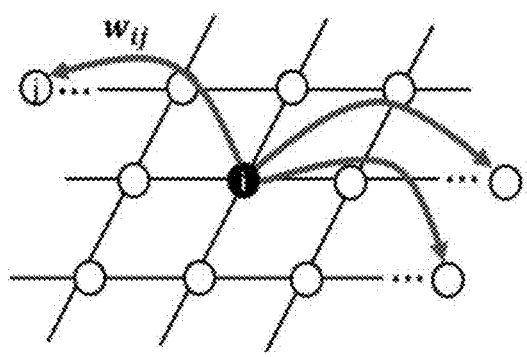

Reference may be made to a combination of FIG. 1A to FIG. 1C which is a schematic diagram of a non-salient image which is discarded during construction of an image salient benchmark dataset according to the present disclosure. During construction of an image salient benchmark dataset in the present disclosure, analysis is performed to an image source of different scenario complexities; for an image including an exact salient object, incorporate it into the dataset; for an image including ambiguous or fuzzy salient object, then discard it. For an image which is not incorporated into the benchmark dataset, the present disclosure summarizes and analyzes reasons why this type of image does not include the salient object, concluding top three reasons. As shown in the combination of FIG. 1A to FIG. 1C, for images shown in FIG. 1A, each image includes a plurality of similar objects, and thus it is difficult to decide which object is most salient; for images shown in FIG. 1B, an included object either has a fuzzy boundary, or is blocked or covered by other objects partially, making it difficult to manually mark a clear object boundary contour; for images shown in FIG. 1C, salient regions therein are about semantics such as roads, water, rocks or clouds, whereas semantics of such semantics usually appears in a background of an image. Therefore, for the above three reasons, in combination with the prior definitions about the salient object, the present disclosure proposes a new definition about the salient object, that is, having limited similar interference objects, having a relatively clear and simple boundary, and the salient object has relatively high objectness. In addition, during the construction of the dataset, for images incorporated into the dataset and having exact salient objects, it is found in the present disclosure that each image has different scenario complexities; moreover, each image has its own specific saliency pattern.

Reference may be made to a combination of FIG. 2A to FIG. 2E which is a schematic diagram of manifold preserving foreground probability propagation according to the present disclosure. As mentioned before, if an image includes a plurality of similar objects, then these objects are mostly non-salient objects. In other words, the similarity between objects within the image is an important clue to distinguish a salient object from a non-salient object. Based on this, the present disclosure proposes a method for estimating image foreground probability, which describes a position where a salient object may exist according to the similarity between objects. For this reason, firstly, according to the SLIC approach proposed in 2012, divide an image into N superpixels, and then according to an empirical value, the value of N is set to 200 in the present disclosure. For any superpixel $S_i$, use $c_i$ and $p_i$ to respectively represent a color vector in LAB color space and a corresponding average position vector.

In order to generate the manifold preserving foreground probability map, a feature pair $\{c_i, p_i\}$ is given, firstly, it is required to select a most trusted foreground seed point and a most trusted background seed point. To simplify the expression, the present disclosure uses a indication vector $y=[y_1, \ldots, y_N]$ to characterize a foreground probability of an image, where $y_i \in [0,1]$ represents a foreground probability of any superpixel $S_i$. In order to estimate the value of y, we use background prior, that is, assuming that a region of an image boundary belongs to a background. Based on this, we initialize the value of y, set an initial foreground probability value corresponding to superpixels falling on the image boundary to 0, otherwise to 1; subsequently, construct the following optimization problem to obtain an optimized foreground probability $\hat{y}$, $$\min_{\hat{y}} \sum_{i=1}^{N} \|\hat{y}_i - y_i\|_2^2 + \lambda_\mu \sum_{i=1}^{N} \sum_{j \in N_j^1} \alpha_{ij}(\hat{y}_i - \hat{y}_j)^2,$$

s.t. $0 \circ \bar{y} \circ 1$, where $N_j^1$ represents a superpixel index set adjacent to the superpixel $S_i$, and $\lambda_\mu$ is a constant acting on a second smoothing term, which is used to improve a foreground probability similarity between spatial neighborhood superpixels; $\alpha_{ij}$ is a positive weight parameter, which is used to measure a color similarity between two superpixels $S_i$ and $S_j$, $$\alpha_{ij} = \exp\left(-\frac{\|c_i - c_j\|_2^2}{\sigma^2}\right).$$

Considering that this optimization problem only includes quadratic and linear terms, a gradient descent algorithm may be used in the present disclosure to solve the quadratic programming problem. Furthermore, in order to suppress a potential background region having similarity to an image boundary as much as possible, difference $\alpha_{ij}$ between colors is taken into account in the present disclosure. In an actual process of the present disclosure, we use an upper boundary of the image, a lower boundary of the image, a left boundary of the image and a right boundary of the image to initialize y respectively. Set $\hat{y}^t$, $\hat{y}^l$, $\hat{y}^r$, $\hat{y}^b$ as respective optimized foreground probability values, and a final foreground probability value of superpixels in the indication vector may be obtained collaboratively, $$\hat{y}_i^* = \hat{y}_i^l \cdot \hat{y}_i^t \cdot \hat{y}_i^r \cdot \hat{y}_i^b$$

Based on $\hat{y}_i^*$, set two threshold values $T_{low}$ and $T_{high}$ in the present disclosure to obtain most trusted foreground and background seed points. That is to say, set a superpixel satisfying $\hat{y}_i^* > T_{high}$ as a foreground seed point, and set a superpixel satisfying $\hat{y}_i^* < T_{low}$ as a background seed point. In an actual process, set $T_{high}$ as twice the average value of the foreground probability vectors $\hat{y}$ according to the empirical value in the present disclosure, and set $T_{low}$ to 0.05.

During selection of a seed point, only color contrast is used, since it is inevitably that a non-salient superpixel will be identified as the foreground seed point. Because the non-salient object usually has a plurality of similar candidate objects, the present disclosure further proposes a foreground probability map based on manifold preserving foreground propagation. Different from the selection of the seed point, we introduce a local linear embedding algorithm to guide a foreground propagation process. As the schematic relationship among points A, B and C in FIG. 2A to FIG. 2C, in the newly generated foreground probability map, maintain position and color relationships between superpixels and their nearest neighbors. In this way, a large salient object may be highlighted prominently. In order to construct the spatial relationship between the superpixels, solve the following problem:

$$\min_{\{w_{ij}\}} \sum_{i=1}^{N} \left\| c_i - \sum_{j \in N_i} w_{ij} c_j \right\|_2^2 + \left\| p_i - \sum_{j \in N_i^K} w_{ij} p_j \right\|_2^2,$$

$$\text{s.t.} \sum_{j \in N_i} w_{ij} = 1, \forall i = 1, 2, \ldots, N,$$

where $N_i^K$ is an index number of the $K^{th}$ nearest neighbor of the superpixel $S_i$, in the present disclosure, the value of K is set to 5. Finally, an N×N relationship matrix $W=[w_{ij}]$ may be obtained, which is used to record a manifold structure relation among all superpixels in a feature space. Based on this matrix, the foreground may be propagated using the following formula, $$\min_{\overline{y}} \|\overline{y} - W\overline{y}\|_2^2 + \lambda_{lle} \sum_{i \in S} (\overline{y}_i - g_i)^2$$

$$\text{s.t.} \quad 0 \circ \overline{y} \circ 1,$$

where S is selected foreground and background seed point sets; $g_i$ is an indicated value, when the superpixel $S_i$ belongs to a foreground seed point set, its value is 1, otherwise 0; $\overline{y}_i$ represents the $i^{th}$ item of the final foreground probability vector $\overline{y}$. In the formula above, the first term is used to describe the manifold preserving foreground propagation, and the second term is used to ensure consistency with the foreground probability of the seed points. $\lambda_{lle}$ is a constant value which is used to balance the first term and the second term. Since both the first term and the second term are square errors, a least square algorithm may be used to solve a final probability value. Finally, the foreground probability value of the superpixels is assigned to all pixels it contains, so that a foreground probability vector is converted to the foreground probability map.

Reference may be made to a combination of FIG. 3A to FIG. 3E which is a schematic diagram of results of different aggregation modes of a multi-linear exemplar regressors according to the present disclosure. Given a foreground probability map, an image salient object segmentation model may be obtained by aggregating different linear exemplar regressors. The specific steps of obtaining the image salient object segmentation model may be obtained are as follows. Set I as an image training set, and G is a benchmark map corresponding to the image I∈I. Firstly, the present disclosure uses an MCG approach proposed by Arbelaez in the CVPR in 2014 to generate a candidate object set from an image and set the candidate set as O. Moreover, the present disclosure uses a fixation prediction model to generate an interest map, that is, a fixation density probability map, revealing a most interesting region in the image. Furthermore, we calculate a benchmark saliency probability value for each candidate object O∈$O_I$, $$G(O) = \frac{1}{|O|} \sum_{p \in O} G(p)$$

where p represents a pixel in the candidate object O. During training of a segmentation model, we only select candidate objects satisfying G(O)>0.7 as positive samples and candidate objects satisfying G(O)<0.3 as a negative sample, respectively indicated as $O_I^+$ and $O_I^-$. Subsequently, we calculate a heuristic feature $V_O$ for each candidate object O in the positive sample $O_I^+$ and the negative sample $O_I^-$. This feature includes 14-dimensional shape descriptions in the MCG approach and additional 11-dimensional shape descriptions, including a center of gravity position, a ratio of length to width, direction, eccentricity, and the like; additionally, there are also 27-dimensional foreground descriptions and 27-dimensional interest descriptions. Eventually, a candidate object O may be indicated by a 79-dimensional feature vector $v_O$.

Given the feature descriptions, the following energy formula is solved through minimization; in the present disclosure, linear exemplar regressors $f(v)$ are trained for each training image, which is used to characterize a particular saliency pattern of the training image.

$$\min_{f} \frac{1}{2} \|w\|_2^2 + C^+ \sum_{O \in O^+} \zeta_O + C^- \sum_{O \in O^-} \zeta_O,$$

$$\text{s.t.} \quad \forall O \in O^+, w^T v_O + b \geq 1 - \zeta_O, \zeta_O \geq 0,$$

$$\forall O \in O^-, w^T v_O + b \leq \zeta_O - 1, \zeta_O \leq 0,$$

where, according to the empirical value, $C^+$ and $C^-$ are set to $1/|O^+|$ and $1/|O^-|$ respectively, which is used to balance impacts resulting from the number of positive and negative samples. Additionally, w and b are parameters of the linear exemplar regressors $f(v)$.

Figure 3A:
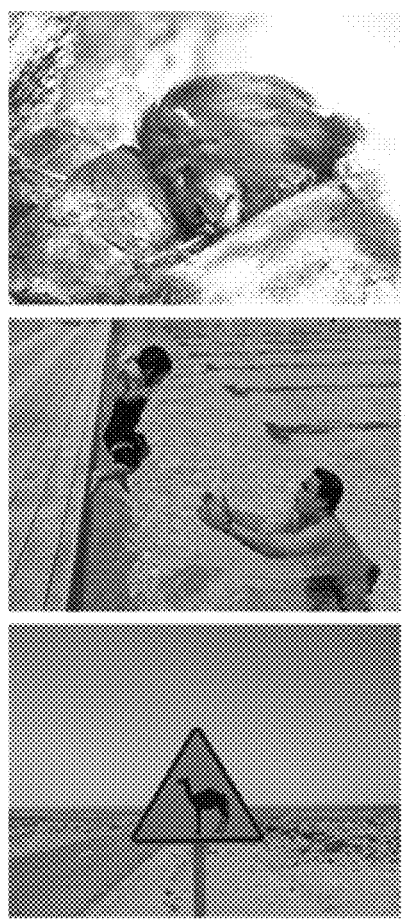
FIG. 3A is an input image.
Figure 3B:
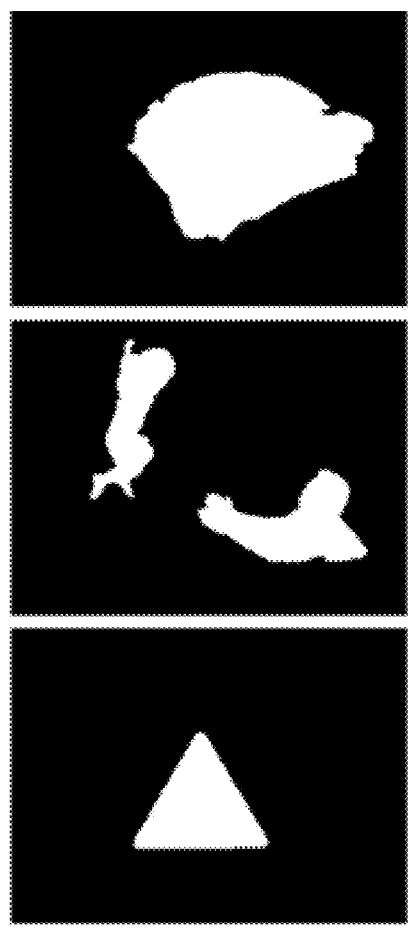
FIG. 3B is an image benchmark saliency map.
Figure 3C:
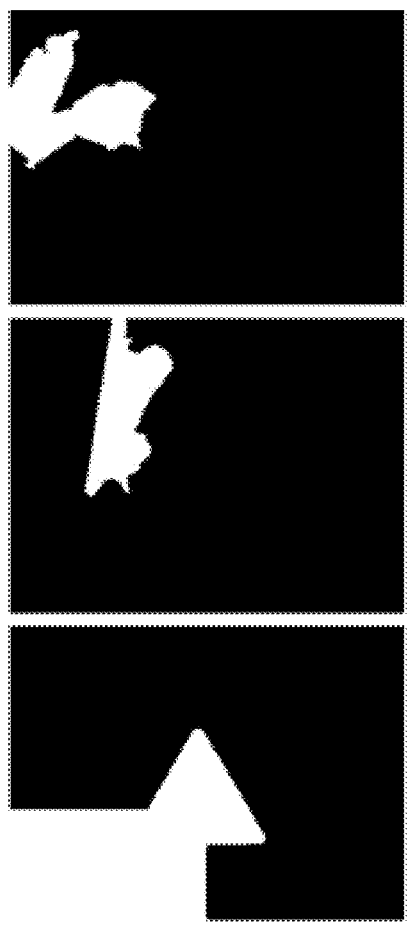
FIG. 3C is image salient segmentation results obtained by calculating a maximum value of multi-linear exemplar segmentation results.
Figure 3D:
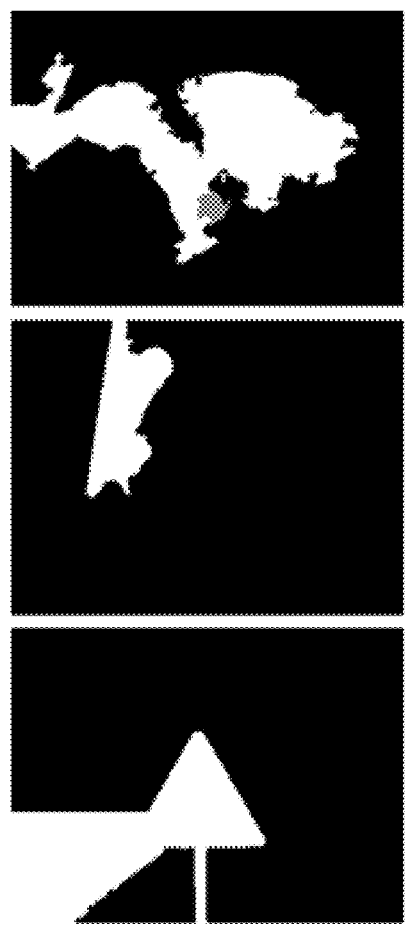
FIG. 3D is image salient segmentation results obtained by calculating an average value of multi-linear exemplar segmentation results.

Given all linear exemplar regressors, for the candidate object O in the test image, the number of |I| saliency values may be obtained, indicated as $\{f_I(v_O)|I \in I\}$. However, saliency values calculated by each linear regression fall into different ranges, therefore, if the |I| saliency values are added directly, then it will result in generation of an inaccurate saliency map. As shown in FIG. 3C and FIG. 3D, FIG. 3A is an original image, FIG. 3B is a corresponding benchmark map, a calculating method for results in FIG. 3C is to solve a maximum value of the |I| saliency values, acting as a final saliency value of the candidate object O, and a calculating method for results in FIG. 3D is to solve an average value of the |I| saliency values, acting as a final saliency value of the candidate object O.

Figure 3E:
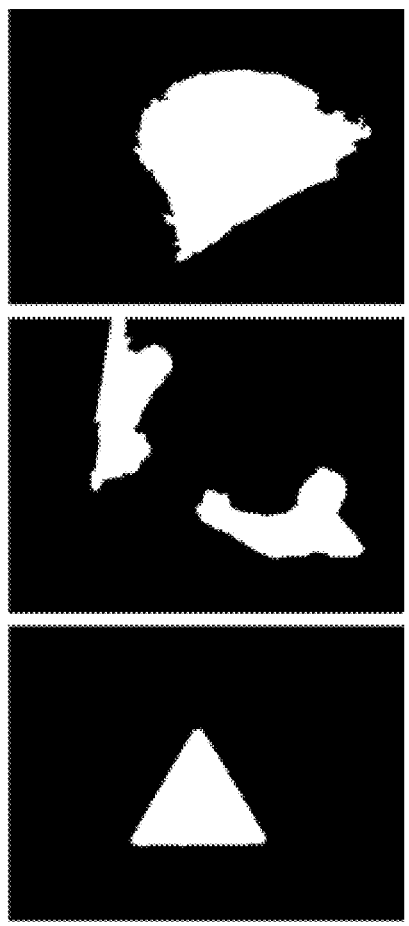
FIG. 3E is image salient segmentation results obtained by an aggregation mode of a multi-linear exemplar regressors provided in the present disclosure.
Figure 4:
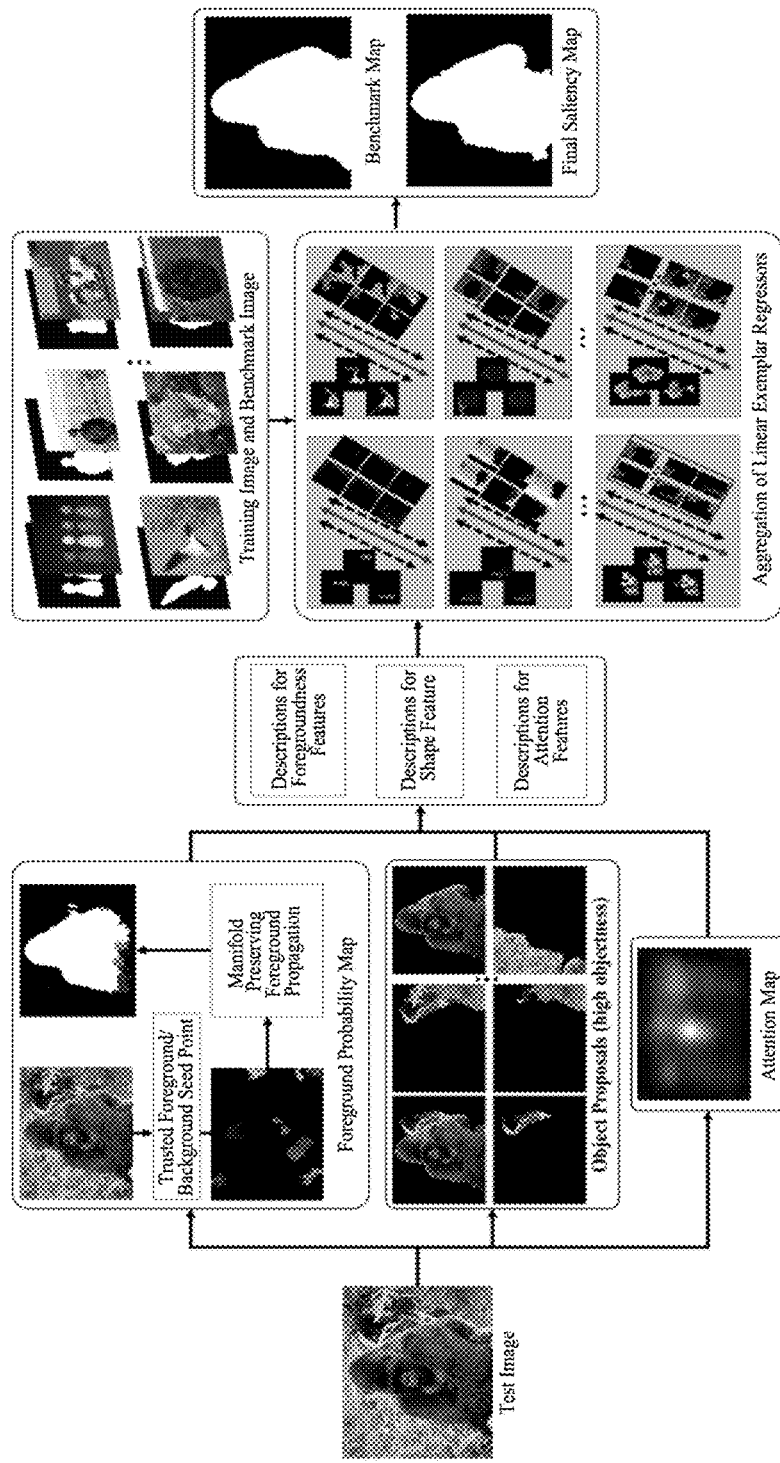
FIG. 4 is a schematic flow chart of a method for salient object segmentation of an image by aggregating multi-linear exemplar regressors according to the present disclosure.

In order to better aggregate results of a single linear regression, the present disclosure proposes an enhancing operation for $\{f_I(O)\}$, which increases probability for correlating results of a most relevant linear exemplar regressor, and suppresses effects caused by results of irrelevant linear exemplar regressors. The enhancing operation mainly uses the following perceptual operation, $$f(x) = \frac{1}{1 + e^{-a(x-b)}}$$

where, $x \in \{f_I(O)\}$. a and b are predefined parameters, which are used to control degree of enhancement of the operation, so that uncertain intermediate scores are suppressed, and scores of a linear exemplar regressors with high confidence are retained. In this way, a linear exemplar regressors being highly consistent with the saliency pattern of the test image will be emphasized, enabling the aggregated salient object segmentation model to be more adaptive. FIG. 3E is diagram of salient object segmentation results after this operation is used. Finally, we convert saliency probability values of enhanced superpixels into a pixel-leveled saliency probability map, $$Sal(p) = \frac{1}{|O|} \sum_{O \in \mathcal{O}} \xi(p \in O) g \sum_{l \in I} f(f_l(v_O))$$

where, $\xi(p \in O)$ is an indicator function, if the pixel $p \in O$, then the value is 1, otherwise the value is 0. Subsequently, the obtained saliency probability map is normalized into the range of [0, 1], and a post-processing morphological operating approach which was delivered by Zhang et al. in the ICCV in 2015 is used to improve contrast of the saliency probability map, obtaining more accurate and smoothing salient object segmentation results.

The foregoing description is merely basic illustration of the present disclosure, and any equivalent transform which is made according to the technical solutions of the present disclosure should be within the protection scope of the present disclosure.

What is claimed is:

1. A method for salient object segmentation of an image by aggregating multi-linear exemplar regressors, wherein the method comprises steps of:

step (1), analyzing and constructing a salient object and a non-salient object in an image salient benchmark dataset, summarizing and defining intrinsic visual attributes of the non-salient object and the salient object respectively;

step (2), guiding manifold preserving foreground propagation by using a background prior condition in combination with a local linear embedding algorithm based on superpixel division, generating an image foreground probability map collaboratively;

step (3), based on the foreground probability map and features of the visual attributes of the non-salient object and the salient object, defining steps for image salient object segmentation as:

step (3.1), using each training image to generate a candidate object set via an objectness adopting proposal, defining feature descriptions of each image candidate object, comprising a geometric shape feature, a foregroundness and an attention feature;

step (3.2), treating the candidate object of the training image as a training sample, and setting positive samples and negative samples, constructing a linear exemplar regressors based on a linear support vector machine;

step (3.3), defining a aggregation pattern for the multi-linear exemplar regressors, adaptively determining for the candidate object of each test image a saliency value, rendering to better suppress the non-salient object and highlight the salient object, and fulfilling the image salient object segmentation;

wherein, regarding defining the feature descriptions of the candidate object in step (3.1), firstly, dividing the image into a candidate object set by using the objectness adopting proposal, using an objectness score to characterize a probability for each candidate object to become the object, according to top three features of the intrinsic visual attributes of the non-salient object, that is, a plurality of similar objects, complex boundary shape and low objectiveness, performing feature descriptions for each image candidate object, comprising a geometric shape feature, a foregroundness and an attention feature, to this end, generating a foregroundness by using the foreground probability map generated in step (2); generating an interest probability map by using a pre-trained attention fixation prediction model, and generating the attention feature for each candidate object; additionally, for each candidate object, characterizing geometric attributes using a ratio of length to width, a ratio of area to perimeter, a center of gravity position and eccentricity.

2. The method for the salient object segmentation of the image by aggregating the multi-linear exemplar regressors according to claim 1, wherein, regarding exploring and summarizing the features of the visual attributes of the salient object and the non-salient object in step (1), by constructing the image salient benchmark dataset, deeply analyzing an image which is discarded and comprised during the construction of the dataset, comprehensively investigating and surveying the intrinsic visual attributes of the salient object and the non-salient object, in the determination of whether the image comprising the salient object, if being determined ambiguous or confusing, then discarding the image, top three reasons which prevent an object from being determined as an unambiguous salient object comprising: a plurality of similar objects, complex boundary shape and low objectiveness, for an image comprising an explicit salient object, it being found that different images have significantly different saliency patterns, thus a salient object segmentation model should be capable of adaptively satisfying different image scenarios and suppressing interference of the non-salient object.

3. The method for the salient object segmentation of the image by aggregating the multi-linear exemplar regressors according to claim 1, wherein, top three reasons which are used for determining as the non-salient object in step (1) respectively comprise a plurality of similar objects, complex boundary shape and low objectiveness, wherein a plurality of similar objects means that, for an image comprising a plurality of similar candidate objects, it is difficult to decide which object is most salient, that is, when each of the plurality of objects is likely to be determined as a salient object, multi-label ambiguity will be incurred inevitably; complex boundary shape means that, the more complex the shape of an object, the more likely to be determined as a non-salient, especially in a case wherein the object has a fuzzy boundary or is blocked partially, the object will be determined as a non-salient object mostly; low objectiveness means that, due to semantic attributes, a most salient region will also be determined as the salient object, particularly roads, water or rocks, these semantic objects are usually treated as image backgrounds.

4. The method for the salient object segmentation of the image by aggregating the multi-linear exemplar regressors according to claim 1, wherein, regarding generating the foreground probability map in step (2), firstly dividing the image into superpixels, then introducing a background prior assumption condition, constructing a quadratic optimization problem, solving an initial foreground probability map, adaptively selecting a threshold value, selecting a most trusted foreground background seed point and a most trusted background seed point; then using the local linear embedding algorithm to construct a nearest-neighbor linear relation between each superpixel and feature space, performing manifold preserving foreground propagation in combination with the trusted seed point, and obtaining a final foreground probability map possibly by highlighting the salient object and suppressing a candidate background object comprising a plurality of similar objects.

5. The method for the salient object segmentation of the image by aggregating the multi-linear exemplar regressors according to claim 1, wherein, the constructing the linear exemplar regressors in step (3.2) comprises: for each training image, firstly generating a candidate object set, performing characterization to the candidate object set by using the three feature descriptions in step (3.1); then calculating a benchmark degree for each candidate object according to a benchmark saliency map of the training image, setting a threshold value of the benchmark degree, dividing the candidate object set into positive samples and negative samples; and finally training the linear exemplar regressors by using the linear support vector machine to characterize a specific method to highlight the salient object and suppress the non-salient object.

6. The method for the salient object segmentation of the image by aggregating the multi-linear exemplar regressors according to claim 1, wherein, the aggregation pattern for the multi-linear exemplar regressors in step (3.3), characterizing, by each linear exemplar regressors, a particular saliency pattern of a corresponding training image, in order to be able to process a salient object segmentation task of any complex scenario, being capable of adaptively aggregating the linear exemplar regressors, for any candidate object of a test image, calculating, by each linear exemplar regressors, a saliency probability it characterizes, designing a perception function to render it to highlight a most relevant linear exemplar regressor, suppress noise caused by an irrelevant regression, and improve accuracy of final salient results.

* * * * *